United States Patent [19]
Hubbard

[11] Patent Number: 6,092,853
[45] Date of Patent: Jul. 25, 2000

[54] VEHICLE SAFETY SYSTEM

[76] Inventor: Leo James Hubbard, 29 Bridgetown Rd., Hilton Head Island, S.C. 29928

[21] Appl. No.: 09/246,751

[22] Filed: Feb. 8, 1999

Related U.S. Application Data

[63] Continuation-in-part of application No. 08/833,040, Apr. 3, 1997, Pat. No. 5,947,543.

[51] Int. Cl.[7] .................................................. B60N 2/02
[52] U.S. Cl. .................................. 296/68.1; 297/216.18; 297/216.19
[58] Field of Search ............................. 296/68.1, 65.15; 297/216.16, 216.18, 216.19, 216.1; 280/735

[56] References Cited

U.S. PATENT DOCUMENTS

| | | | |
|---|---|---|---|
| 2,736,566 | 2/1956 | Hartl | 296/68.1 |
| 3,832,000 | 8/1974 | McDonnell | 296/68.1 |
| 3,858,930 | 1/1975 | Calandra et al. | 296/68.1 |
| 3,992,046 | 11/1976 | Braess | 296/68.1 |
| 5,125,472 | 6/1992 | Hara | 180/271 |
| 5,167,421 | 12/1992 | Yunzhao | 297/216.18 |
| 5,344,204 | 9/1994 | Yunzhao | 296/68.1 |
| 5,398,185 | 3/1995 | Omura | 701/45 |
| 5,413,378 | 5/1995 | Steffens, Jr. et al. | 280/735 |
| 5,439,249 | 8/1995 | Steffens, Jr. et al. | 280/735 |
| 5,573,269 | 11/1996 | Gentry et al. | 280/735 |

FOREIGN PATENT DOCUMENTS

| | | | |
|---|---|---|---|
| 94022692 | 10/1994 | WIPO | 297/216.18 |

*Primary Examiner*—D. Glenn Dayoan
*Assistant Examiner*—Patricia Engle
*Attorney, Agent, or Firm*—Robert C. Brown; Martin LuKacher; Kenneth J. LuKacher

[57] ABSTRACT

An improved system for passenger safety in a front-end vehicle collision, whereby the kinetic energy of a passenger may be reduced before the passenger is exposed to the crash deceleration. An array of variably momentum-responsive electrical sensors mounted in the forward portion of the vehicle senses the onset of a front-end collision and sends one or more crash signals to the passenger compartment. A passenger seat is mounted on translating means permitting rearward motion and has a harness to secure a passenger to the seat. Beneath the seat, attached between the floor of the vehicle and the frame of the seat, is an array of pairs of linear actuators, each actuator being powered by an explosive charge and each pair being electrically connected uniquely to one of the momentum sensors. Upon firing of one or more of the actuator pairs, the seat and its passenger are thrust rapidly rearward so that the passenger is travelling rearward with respect to the vehicle and more slowly forward with respect to the ground, the number of pairs fired after collision of the vehicle being proportional to the forward velocity of the vehicle at the time of the collision. Thus, the kinetic energy of the passenger is proportionally reduced and the intensity of his deceleration from the crash pulse is proportionally minimized.

18 Claims, 4 Drawing Sheets

VEHICLE SAFETY SYSTEM

The present application is and a continuation-in-part of an allowed application, Ser. No. 08/833,040 filed Apr. 3, 1997 and now U.S. Pat. No. 5,947,543, filed Apr. 3, 1997 by L. J. Hubbard, the disclosure of which is hereby incorporated by reference (referred to herein as the '040 application).

The present invention relates to apparatus for protecting seated passengers of vehicles during vehicle collisions, more particularly to apparatus for displacing the front seats of vehicles during vehicle collisions, and most particlarly to apparatus for explosively displacing a seated passenger rearward with respect to the vehicle during a front-end collision to reduce his forward velocity and kinetic energy with respect to the ground, and hence to the vehicle after the vehicle becomes stationary.

In a front-end collision of a vehicle with another object, such as another vehicle or an off-road hazard, the vehicle and its occupants may come to a very sudden stop from a relatively high speed, frequently becoming forward-motionless in a distance of no more than a few feet and in a second or less of time. The initial collision of the vehicle with an object is known as the "primary" collision. A "secondary" collision is said to occur when an unsecured object, such as a passenger, continues forward under its own momentum, after the vehicle has begun to slow down or stop, to collide with a forward portion of the vehicle. It is the secondary collision which is hazardous to the health or lives of a vehicle's occupants because of very abrupt high decelerative forces imposed on passengers, frequently concentrated over a small portion of their anatomy. Decelerations exceeding 5 G (gravitational acceleration) are common.

The automotive industry has devoted enormous resources over many years to developing and implementing techniques and apparatus for reducing the occurrence of secondary collisions, and for minimizing the intensity of impact on humans when such collisions do occur. Thus, vehicles have long been provided with padded dashboards and steering wheels; and more recently with lap belts, shoulder belts, and instantly-inflatable airbags disposed within dashboards and steering columns. These later safety devices share a common assumption, to wit: that in a front-end collision, a passenger's safety will be maximized if he is fully restrained rearward and/or downward against a fixed seat.

This assumption is not necessarily valid. It has been recently recognized, for example, that an improperly deployed air bag can injure or kill a passenger, even though properly restrained, through its own artificial secondary collision. U.S. Pat. No. 5,125,472 issued Jun. 30, 1992; U.S. Pat. No. 5,398,185 issued Mar. 14, 1995; U.S. Pat. No. 5,413,378 issued May 9, 1995; U.S. Pat. No. 5,439,249 issued Aug. 8, 1995; and U.S. Pat. No. 5,573,269 issued Nov. 12, 1996 are all directed to protecting passengers from improper contact with inflated air bags.

A broad range of schemes have been proposed which are intended to protect passengers from secondary collisions by the virtually-instantaneous rotation and/or translation of a portion or all of a passenger's seat at the onset of a head-on collision. However, many of the proposed devices have serious shortcomings which can prevent their achieving the desired ends, especially devices which rely on mechanical or hydraulic linkages and springs for sensing a collision and for moving the seat and which therefore can be too slow in responding.

U.S. Pat. No. 3,832,000 issued Aug. 27, 1974 discloses apparatus for rotating a passenger's seat rearward and downward in response to a cable actuated by a mechanical trigger mechanism extending forward of a vehicle's front bumper. The response time of the disclosed apparatus can be longer than optimum because of dependence on a plurality of levers in the trigger, and the fact that the seat is actuated by springs. It also appears that the device could be set off inadvertently by a low-speed bumper collision, as might occur during parallel parking.

U.S. Pat. No. 3,858,930 issued Jan. 7, 1975 discloses apparatus for translating a passenger's seat forward and then tilting it upward in response to a hydraulic signal from a mechanical sensor in the vehicle's front bumper. Translating the passenger in the direction of travel of the vehicle adds to the forward momentum of the passenger and would seem to be the wrong direction. The translating mechanism uses an explosive charge to move the seat. The charge is contained in, and ignited by, an modified 30—30 caliber rifle cartridge, and the response time of the device is limited by the mechanical and chemical reaction times required to fire a center-fire shell, and by the limited thrust potential of such a shell.

U.S. Pat. No. 3,992,046 issued Nov. 16, 1976 discloses apparatus for translating a passenger's seat rearward in response to transfer of hydraulic fluid from a hydraulic transducer in the vehicle's front bumper to a hydraulic cylinder coupled to the seat. Although this apparatus is intended to displace a passenger in the correct direction specifically to control the deceleration progress of the passenger, response of the system can be limited by the hysteresis in displacing a considerable volume of hydraulic fluid through small-bore tubing and orifices.

U.S. Pat. No. 5,167,421 issued Dec. 1, 1992, and U.S. Pat. No. 5,344,204, issued Sep. 6, 1994 disclose apparatus for translating a passenger's seat rearward in response to an electrical signal from a normally-open momentum-sensitive switch. Response of this device may be relatively slow because of the delay time required to close the switch, and may be inadequate to accelerate a passenger rapidly enough because the seat is actuated only by compression springs.

Allowed U.S. patent application, Ser. No. 08/833,040, discloses a system for very early sensing of a vehicle front-end collision via a novel normally-closed momentum-sensitive electrical switch, very rapid transmission of an actuating signal from the switch to the vicinity of a rearwardly- and/or upwardly translatable passenger seat, and very rapid response of a very powerful apparatus attached to the passenger seat to thrust the seat and its harnessed passenger immediately rearward and/or upward, as by executing combined translation and rotation. A shortcoming of such a system is that the explosive response of the system is confined to a single impulse of charge, which may over-decelerate a passenger in a low-speed collision or may under-decelerate a passenger in a high-speed collision, either of which can engender unnecessary passenger risk.

It is a principal object of the invention to provide an improved system (method and apparatus) for protecting a passenger in a vehicle subject to a front-end collision by accelerating the passenger rearwards of the vehicle with a variably-scalable force which is substantially proportional to the forward velocity of the vehicle.

It is a further object of the invention to provide an improved system for protecting a vehicle passenger in a head-on or front-end collision of the vehicle, wherein an improved momentum-sensing switch is insensitive to lateral momentum changes, thereby preventing actuation of the head-on protection system in a side-collision of the vehicle.

Briefly described, a system in accordance with the invention senses the onset of a front-end collision through a plurality of electrical sensors mounted forward of the passenger compartment of a vehicle, as in the front bumper or on the firewall thereof. Each sensor is a momentumactivatable switch, preferably a normally-closed switch, the opening of which sends a negative signal (loss of electrical continuity). Circuitry connected to the vehicle battery converts the negative signal to a positive signal. Different sensors of the plurality are responsive to differing levels of actuating momentum. When a collision is sensed, one or more electrical signals are sent from one or more of the sensors to the passenger compartment, arriving before the deceleration pulse generated by the crash, which pulse is a shock wave transmitted through the body of the vehicle.

A passenger seat is equipped for virtually instantaneous rearward motion and/or rearward rotation in response to the positive signal. A passenger sitting in the seat is firmly restrained therein by a harness attached to the seat itself, consisting preferably of a lap belt and at least one shoulder belt, so that translation and/or rotation of the seat will simultaneously translate and/or rotate the harnessed passenger backwards.

The seat has a frame which may be disposed for rearward translation on captive slides or rollers, the frame normally being held in place by a catch or shearable pin. Beneath the seat, and disposed for action rearwards between a forward thrust stop attached to the floor of the vehicle and the frame of the seat, is an array of linear actuators, preferably grouped for actuation in pairs, each actuator being powered by an explosive charge stored therein and each pair connected to one of the sensors, which charges may be ignited electrically by circuitry in response to the aforementioned positive signals. The seat is also provided with means for releasing the seat translating means, preferably a guillotine edge disposed in contact with the latch or shear pin for cutting the seat frame loose upon activation of the first actuator.

The seat back and cushion may also be hinged for rotation on the translatable frame backwards and away from the dashboard and steering wheel of the vehicle, and may be equipped with an auxiliary actuator for causing such rotation about the hinge substantially coincident with the linear translation of the frame.

When one or more actuators are ignited, the number of ignited actuators being in proportion to the forward velocity of the vehicle, the seat and its seated passenger are thrust rapidly rearward so that the passenger is travelling rearward with respect to the vehicle and more slowly forward with respect to the ground when the crash pulse arrives in the passenger compartment. Thus, the forward kinetic energy of the passenger and the intensity of his/her deceleration from the crash pulse is reduced in proportion to the forward velocity of the vehicle. Simultaneous retro-rotation of the seat by the auxiliary actuator can orient the passenger more favorably to withstand the remaining shock of the crash pulse.

The foregoing and other objects, features, and advantages of the invention, as well as presently preferred embodiments thereof, will become more apparent from a reading of the following description in connection with the accompanying drawings in which.

Figure 1:
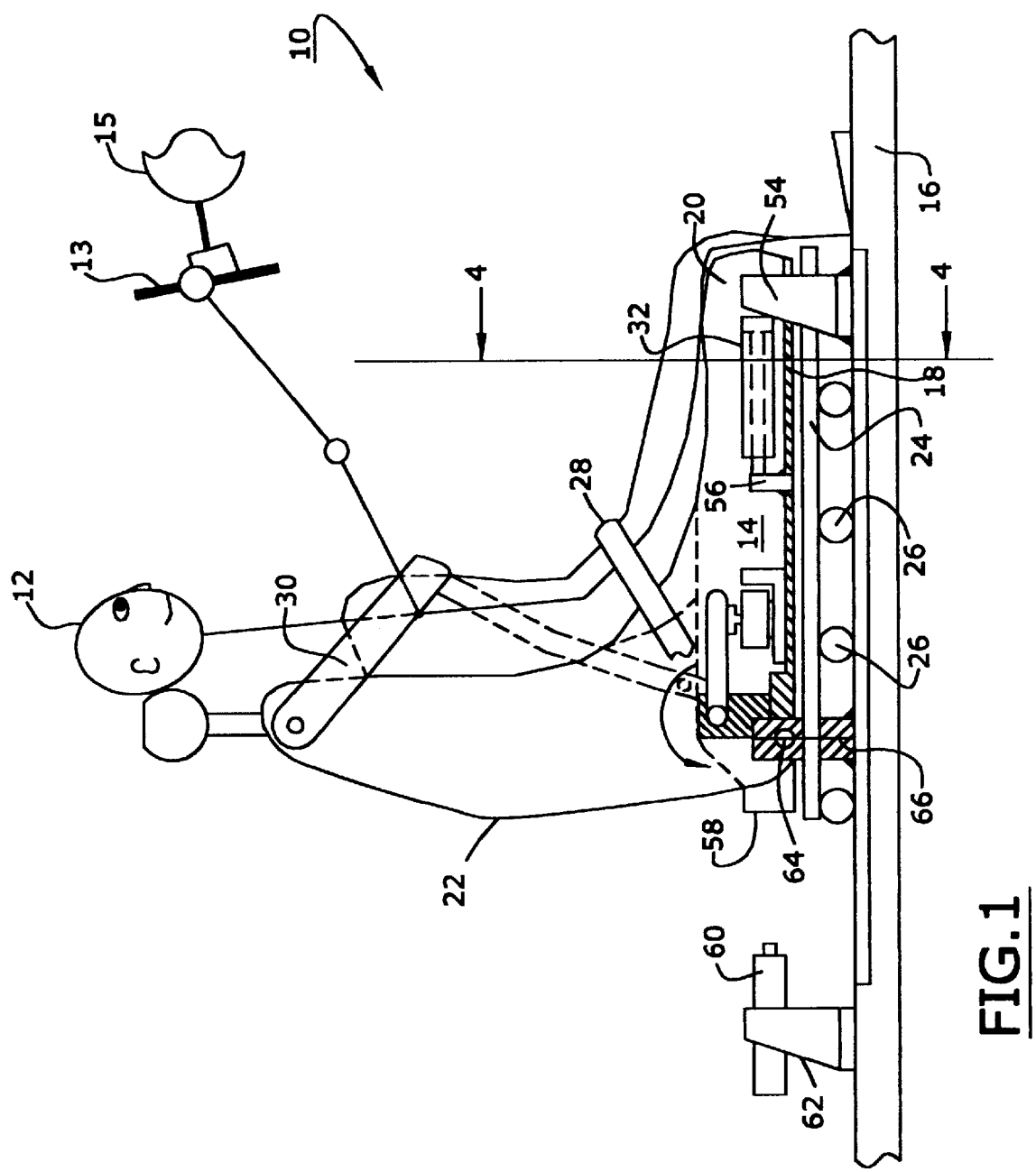
FIG. 1 is a schematic elevational view of a portion of a system in accordance with the invention, showing the principal components within the passenger compartment of a vehicle.

Referring to FIGS. 1–4, there is shown a system 10 in accordance with the invention. A passenger 12 is seated in a seat 14 disposed for translation on floor 16 in the passenger compartment of a vehicle having a steering wheel 13 and a dash board 15. Seat 14 includes a frame 18, cushion portion 20, and back portion 22, the relationship and angle between cushion 20 and back 22 preferably being fixed. Frame 18 is supported by a plate 24 disposed, in the embodiment provided, for rearward translation on rollers 26 which are rollable on floor 16. Other well-known mechanisms may be used to provide for translation of the seat, for example, wheels and rails may be provided on either the seat frame or the floor, or guides and captive slides, or rollers, or other such mechanisms, as disclosed in the parent '040 application. Important requisites of the selected means of translation are that it has low inertia and low friction.

Passenger 12 is firmly restrained in seat 14 via a lap belt 28 and a shoulder harness 30, both of which are secured solely to the seat and not otherwise to the vehicle itself, so that movement of the seat will cause substantially identical movement of the restrained passenger. Preferably, both belt 28 and harness 30 are adjustable in length to accommodate different passengers but are fixed in length when adjusted and are not wound at a free end on centrifugal-clutch arresters such as are well known in many vehicles. Such arresters permit, and indeed require for operation, an undesirable amount of relative motion of the passenger with respect to the motion of the seat in order to activate the clutch.

Figure 4:
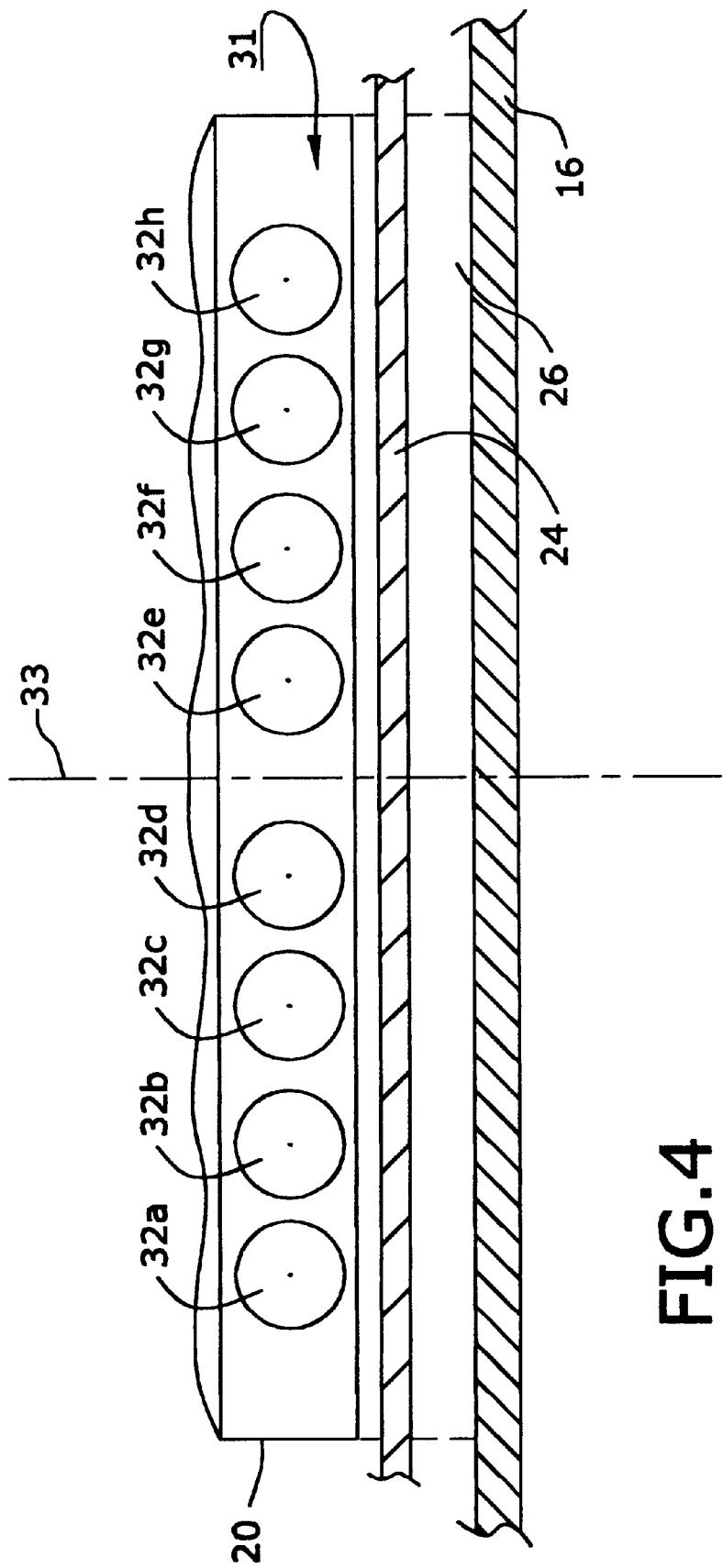
FIG. 4 is a portion of a cross-sectional view taken along line 4—4 in FIG. 1, showing an array of explosive-powered actuators disposed for translating a slidable passenger seat in accordance with the invention.

Within cushion 20 are disposed an actuator array 31 comprising a plurality of parallel-acting linear actuators 32, for example, actuators 32a–32h as shown in FIG. 4. Preferably, actuators 32a–32h are identical in actuating power, although it should be understood that an array of actuators having differing actuating powers is fully within the scope of the invention. Each actuator 32 employs the explosion of a charge of an explodable chemical compound or mixture of compounds stored within the actuator. Preferably, the explodable compound or mixture includes smokeless gunpowder and cellulose nitrate. Preferably, each actuator is formed as disclosed in parent application '040 and employs a fusible link between electrodes to ignite charge, for example, a known miniature lamp wire having a filament resistance of from about 1.5 to about 3.5 ohms.

Figure 3:
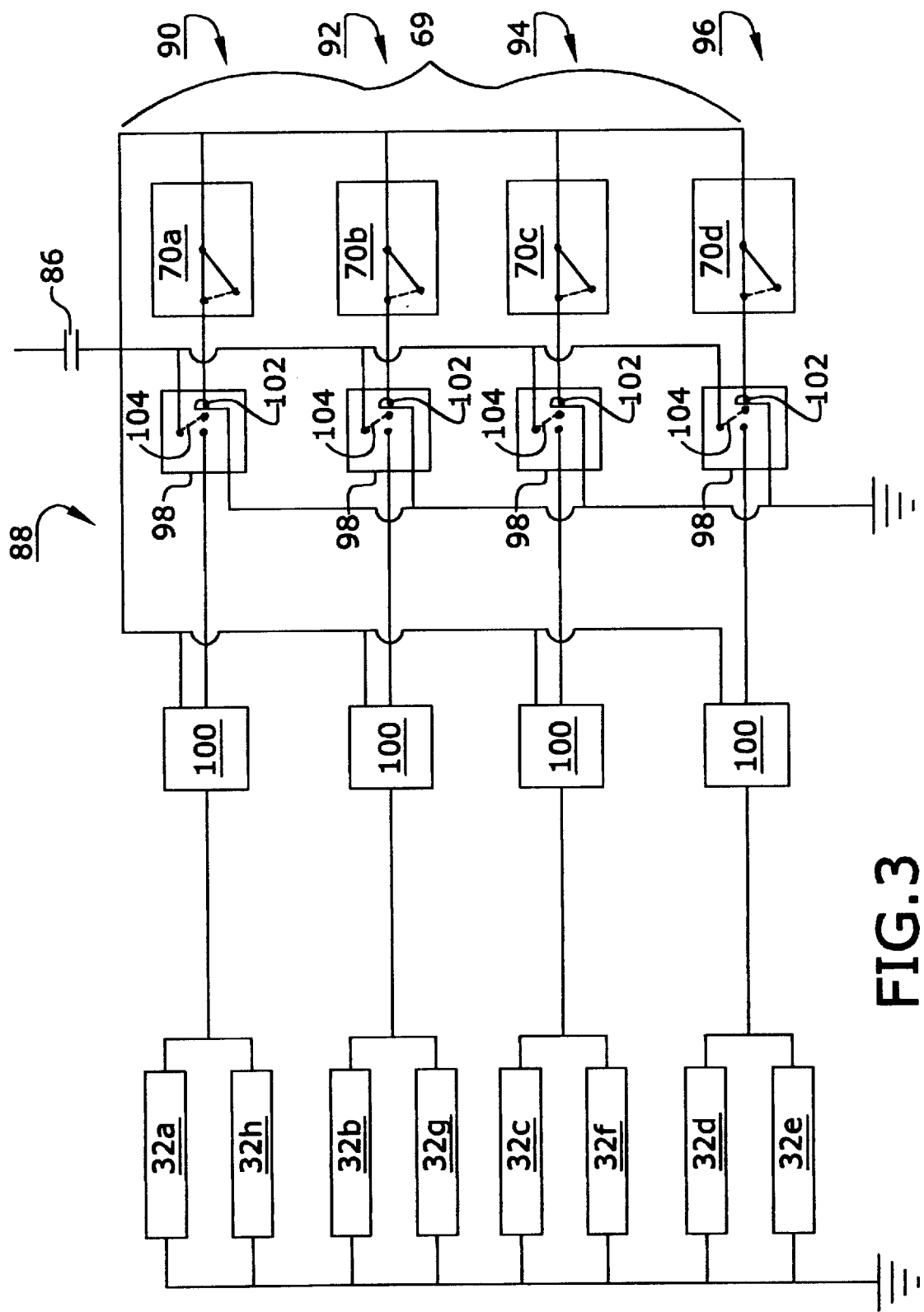
FIG. 3 is a diagram of an electrical control circuit in accordance with the invention.

In a presently preferred embodiment as shown in FIGS. 3 and 4, array 31 comprises an even number of actuators 32 evenly distributed about seat centerline 33 and wired for ignition in pairs on opposite sides of the centerline, e.g., 32a and 32h, 32b and 32g, 32c and 32f, and 32d and 32e, to drive seat frame 18 directly rearwards within the vehicle without exerting torque on the seat frame about a vertical axis therein.

Within cushion 20, first end cap is disposed against a first thrust plate 54, and the distal end of rod is disposed against a second thrust plate 56. Plate 54 is firmly secured to vehicle floor 16 as by welding, and plate 56 is firmly secured to seat frame 18. Frame 18 may be provided with a bumper 58, and translation of seat 14 may be limited by a dash pot 60 mounted in a bracket 62 attached to floor 16.

Preferably, seat 14 is provided with a rapid-action catch as disclosed in parent application '040 for permitting virtually instantaneous translation of seat 14 from its previously locked position.

A vehicle equipped in accordance with the present invention is provided with a sensor array 69 comprising a plurality of momentum-actuable electric switches 70, preferably one for each actuator pair 32a–h, disposed in a position in the vehicle forward of passenger 12, for example, within the front bumper thereof or on the firewall. Such forward mounting of the switches provides a time interval between the sensing of a front-end collision and the arrival of the crash pulse at the passenger. It is preferably during this time interval that the system of the invention is operable to accelerate the passenger rearward of the vehicle with a force proportional to the forward velocity of the vehicle to reduce the forward velocity of the passenger before the crash pulse arrives at the passenger.

Figure 2A:
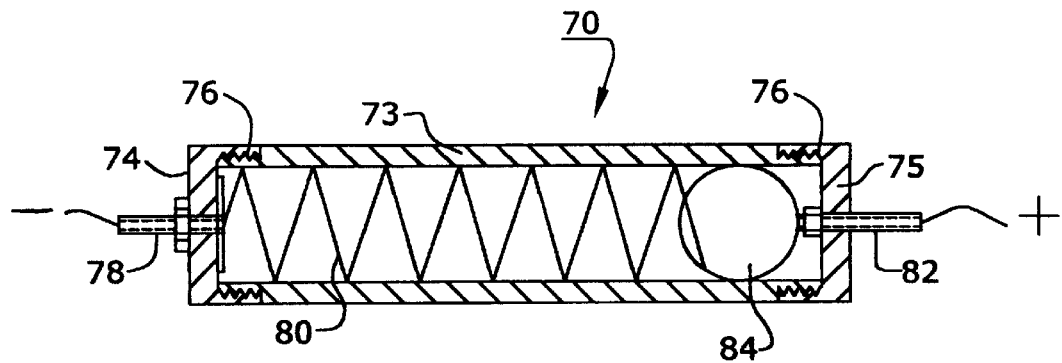
FIG. 2a is a cross-sectional view of a first momentum-actuable electric switch suitable for use in a system in accordance with the invention.
Figure 2B:
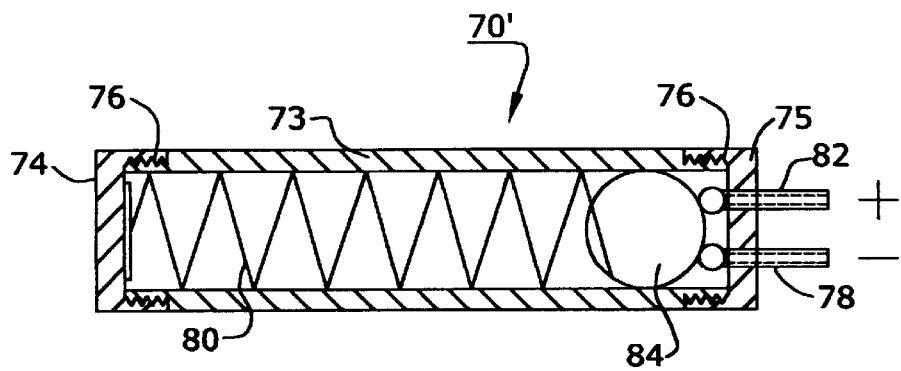
FIG. 2b is a cross-sectional view of a second momentum-actuable electric switch in accordance with the invention.
Figure 2C:
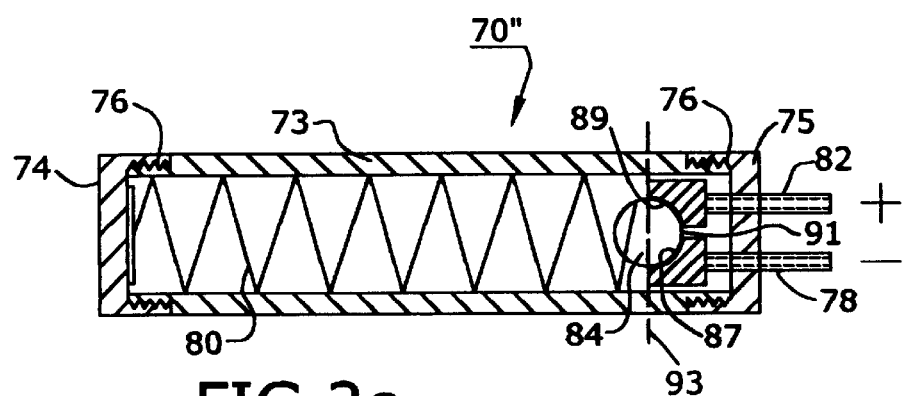
FIG. 2c is a cross-sectional view of a third momentum-actuable electric switch in accordance with the invention, the switch being insensitive to momentum changes in a direction normal to the longitudinal axis thereof.

Each switch 70 (or, in the alternative, 70' or 70'') is preferably a normally-closed switch, since a normally-open switch can impose a substantial time delay to close to send a signal indicative of the onset of a collision, which delay can reduce the time available for operation of the actuators; therefore, a normally-closed switch is preferable. Suitable switches are shown in FIGS. 2a, 2b, and 2c, although other switches known in the art may also be suitable within the scope of the invention. A non-conductive shell or case 73, preferably cylindrical, is provided with end closures, for example, first and second end caps 74,75, respectively, secured as by threading 76. Other closures, such as an injection molded integral cap and shell, may also be acceptable. Terminal 78 extends through first end cap 74 and may make contact with conductive coil spring 80 disposed within case 73, as shown in FIG. 2a. Alternatively, terminal 78 may be disposed through second end cap 75, as shown in FIGS. 2b and 2c. Terminal 82 extends through end cap 75 to make contact with a moveable conductive element 84 within case 73. In the embodiment shown in FIGS. 2b and 2c, terminal 78 also makes contact with moveable conductive element 84. Element 84 is preferably a metal ball which is urged against terminal 82 (and, alternatively in 70' and 70'', terminal 78) by spring 80 to complete electrical continuity between the terminals. Switch 70 is oriented in a vehicle with its longitudinal axis substantially parallel with the longitudinal axis of the vehicle and with end cap 74 leading in the direction of vehicle travel and end cap 75 trailing. In a vehicle collision, switch 70 changes velocity with the vehicle, whereas ball 84, being untethered, tends to continue with velocity unchanged until arrested by spring 80. In effect, ball 84 tends to be forced away from terminal 82 (and, alternatively, terminal 78) by changes in momentum of the switch. The unchanged momentum of ball 84 may temporarily overcome the urging force of spring 80 and open the circuit between terminals 78 and 82. In this sense, switches 70, 70', and 70'' are referred to herein as momentum-sensing, or momentum-sensitive, switches.

It is preferred to use switch 70'' in a system in accordance with the invention. As shown in FIG. 2c, the ends of terminals 78 and 82 which make contact with ball 84 are formed as spherical surfaces 87,89, respectively, concentric with the surface 91 of ball 84 in the switch-closed position. Preferably, surfaces 87,89 extend at their distal extremes to the transverse equatorial plane 93 of ball 84. A switch thus formed, and mounted for operation as described above, is sensitive to momentum changes along any thrust vector passing through the contact portion of ball 84 but not to a thrust vector included in plane 93. Thus, such a switch may be momentum-actuated in any vehicle collision having a head-on component but not in a collision directly from the side of the vehicle. Thus, a switch 70'' can prevent needless and wasteful firing of the system in event of a vehicle side-collision.

The extent of penetration of either or both of terminals 78 and 82 may be adjusted to vary the urging force exerted by the spring, thereby varying the momentum change required to open the switch. The urging force may also be varied by varying the spring constant of the individual springs 80 used in each actuator. For example, in array 69, each of switches 70a through 70d is provided with an increasingly stronger spring such that the number of switches opened in a collision is proportional to the momentum of the vehicle and hence to the forward velocity of the vehicle. The strengths of springs 80 may be varied such that in a low-speed collision only one of the switches is activated, firing thereby only the single pair of actuators 32a–h to which it is connected, whereas in higher-speed collisions one or more additional of switches 70a–d may be activated so that additional pair of actuators 32a–h may be fired. Thus the array 69 of momentum-sensing switches 70a–d and the connected array 31 of pairs of actuators 32a–h provides a rearwards thrust to passenger 12 seated in seat 14 which is the additive thrust of the number of pairs fired and which is substantially proportional to the forward velocity of the vehicle.

A suitable circuit 88 in accordance with the present invention is shown in FIG. 3. A battery 86, preferably the 12-volt vehicle starting battery, is connected (preferably through the vehicle ignition switch, not shown) to system 88 comprising a plurality of independent, parallel-wired, generally identical subsystems 90,92,94,96 for sensing the onset of a vehicle front-end collision and responding by accelerating a seated passenger rearwards within the vehicle. Subsystems 90–96 differ only in the momentum sensitivity of the sensors 70a,70b,70c,70d, such that the number of sensors responding additively in a vehicle front-end collision is governed by the momentum of the sensor, and hence the velocity of the vehicle, at the moment of collision. For example, sensor 70a may be so constructed, as previously described, such that the contacts are opened in any collision at a vehicle velocity greater than 15 mph; 70b, greater than 30 mph; 70c, greater than 45 mph; and 70d, greater than 60 mph. Thus, for example, in a collision at 50 mph, sensors 70a,70b,70c would respond, but not sensor 70d.

Each subsystem in accordance with the invention may be similar to the system disclosed in the '040 application. Preferably, each subsystem comprises a momentum-responsive switch 70 which is preferably normally-closed, an inverter 98 containing a normally-closed delay relay 102 connected to battery 86, a power amplifier 100 also connected to battery 86 for increasing voltage, and a pair of explosive-powered actuators 32. To continue the above example, for reasons of thrust balance as previously described, the subsystem including sensor 70a would also include actuators 32a and 32h; 70b, actuators 32b and 32g; 70c, actuators 32c and 32f; and 70d, actuators 32d and 32e. In other words, FIG. 3 represents the wiring relationship of the actuators, whereas FIG. 4 represents their spatial relationship.

In operation, referring again to FIG. 3, prior to a front-end vehicle collision the contacts in sensor switches 70a–70d are held closed by each switch's respective spring. Current flowing through each sensor 70 energizes relay 102 in each inverter 98 to hold open a spring-bias-to-close switch 104. Thus, amplifiers 100 and actuators 32 are not energized. At the time of a momentum-changing vehicle front-end collision (switches 70a–70d being oriented in the vehicle such that momentum changes only in the normally forward direction of travel of the vehicle are sensed), one or more of switches 70a–70d is opened, thereby de-energizing associated relay 102, releasing for closure the associated inverter switch 104 and firing the associated actuators 32.

From the foregoing description it will be apparent that there has been provided an improved system for vehicle passenger safety, wherein the kinetic energy of a vehicle passenger may be substantially reduced before the passenger is exposed to the crash deceleration pulse, in proportion to the forward velocity of the vehicle at the time of the collision. Variations and modifications of the herein described system, in accordance with the invention, will undoubtedly suggest themselves to those skilled in this art. Accordingly, the foregoing description should be taken as illustrative and not in a limiting sense.

What is claimed is:

1. A system for enhancing the safety of a passenger secured to a rearwardly-displaceable seat in a vehicle during a front-end collision of the vehicle, comprising a plurality of subsystems, each of said subsystems including:
   a) at least one between said passenger seat and said vehicle actuator for displacing said seat rearwards within said vehicle, said actuator having an explodable charge therein;
   b) an electrical sensor mounted on said vehicle for sensing momentum change resulting from said collision and for transmitting an electrical signal indicative thereof to said actuator; and
   c) an ignitor in said actuator responsive to said electrical signal and connected to said explodable charge within said actuator whereby explosion of said charge rapidly displaces said seat and said secured passenger rearwardly of said vehicle,
   at least one of said electrical momentum change sensors having a different sensitivity to momentum change from the other sensors so that, responsive to any front-end collision, the number of said electrical sensors each transmitting an electrical signal is substantially proportional to the forward velocity of said vehicle.

2. A system in accordance with claim 1 wherein each of said subsystems comprises two of said actuators electrically connected to each one of said electrical sensors.

3. A system for enhancing the safety of a passenger in a vehicle during a front-end collision of the vehicle, comprising:
   a) a seat for a passenger, said seat being mounted on a translator carriage attached to said seat and to said vehicle, said seat being displaceable rearwardly within said vehicle;
   b) a restraining harness attached to said seat for securing said passenger to said seat during an actuation cycle of said system;
   c) a plurality of subsystems connected to an electric power source within said vehicle for rearwardly displacing said seat, each of said subsystems including at least one actuator having an explodable charge therein and being connected in rearward motivating displacement relationship between said passenger seat and said vehicle, a momentum change sensor mounted on said vehicle for sensing momentum change resulting from said front-end collision and for transmitting an electrical signal indicative thereof to said actuator, and ignition means in said actuator responsive to said electrical signal for igniting said explodable charge within said actuator to rapidly displace said seat and said secured passenger rearwardly of said vehicle,
   at least one of said momentum change sensors having a different sensitivity to momentum change from the other sensors.

4. A system in accordance with claim 3 wherein each of said electrical sensors has a different momentum sensitivity from the other of said sensors such that, responsive to a front-end collision at any vehicle velocity, the number of said electrical sensors each transmitting an electrical signal is substantially proportional to the forward velocity of said vehicle.

5. A system in accordance with claim 3 wherein each of said momentum-change sensors comprises a normally-closed electrical switch, said switch being openable during said collision by momentum-induced motion of a movable contact element within said switch.

6. A system in accordance with claim 5 further comprising an electrical relay switch biased to a first position thereof when said momentum-sensing switch is closed, and biased to a second position thereof when said momentum-sensing switch is opened.

7. A system in accordance with claim 3 wherein each of said subsystems includes two of said actuators disposed on opposite sides of a centerline through said passenger seat.

8. A system in accordance with claim 3 wherein said translator carriage includes at least one rail attached to said vehicle and at least one slide attached to said seat for sliding on said rail.

9. A system in accordance with claim 3 wherein said translator carriage includes at least one rail attached to said vehicle and at least one rotatable wheel attached to said seat for rolling on said rail.

10. A system in accordance with claim 3 wherein said translator carriage includes at least one slide attached to said vehicle and at least one rail attached to said seat for sliding on said slide.

11. A system in accordance with claim 3 wherein said translator carriage includes at least one wheel rotatably attached to said vehicle and at least one rail attached to said seat for rolling on said wheel.

12. A system in accordance with claim 3 wherein said passenger seat includes a generally horizontal cushion for sustaining the weight of said passenger and a generally vertical back for supporting the upper torso and of said passenger against decelerative and accelerative thrusts exerted upon said passenger by said collision and by activation of said system, respectively.

13. A system in accordance with claim 3 wherein said harness includes a belt fastenable across the lap of said passenger.

14. A system in accordance with claim 13 wherein said harness further comprises at least one belt fastenable across the upper torso of said passenger.

15. A system in accordance with claim 3 wherein said electric power source is a battery.

16. A system in accordance with claim 3 further comprising a voltage amplifier in at least one of said subsystems for increasing the voltage output transmitted from said power source to said actuator.

17. A system in accordance with claim 5 wherein said momentum-sensing switch is disposed in a portion of said vehicle forward of said passenger.

18. A system in accordance with claim 17 wherein said momentum sensing switch is disposed in a front bumper of said vehicle.

* * * * *